April 10, 1962
L. TALALAY
3,028,610
FOAM RUBBER CUSHIONING
Filed June 9, 1959
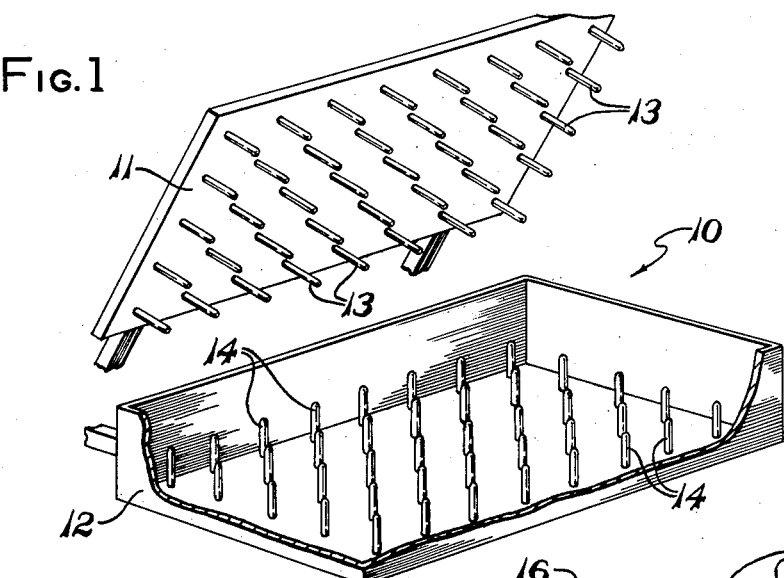
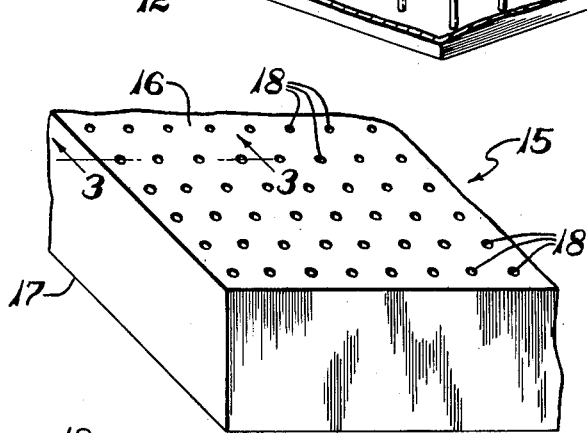
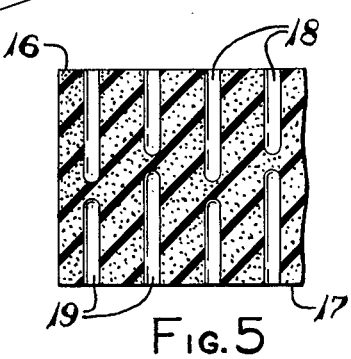
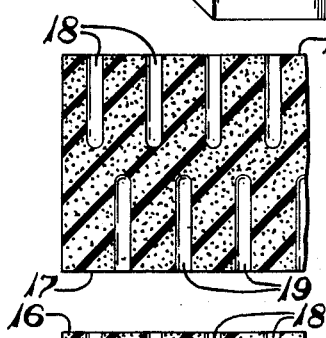
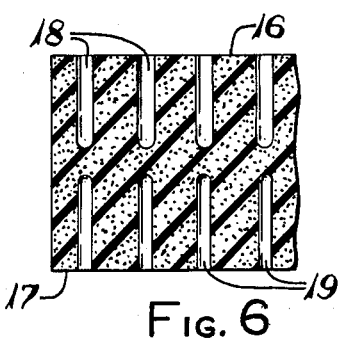
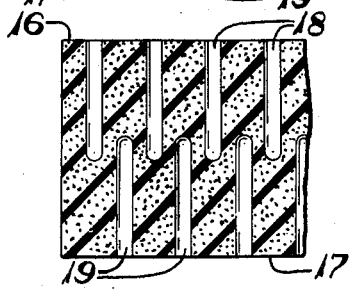
INVENTOR.
LEON TALALAY
BY James R. Lindsay
ATTY.

United States Patent Office 3,028,610
Patented Apr. 10, 1962

3,028,610
FOAM RUBBER CUSHIONING
Leon Talalay, New Haven, Conn., assignor to The B. F. Goodrich Company, New York, N.Y., a corporation of New York
Filed June 9, 1959, Ser. No. 819,185
6 Claims. (Cl. 5—355)

This invention relates to cushioning material and pertains more particularly to resilient foam rubber cushioning.

In recent years, furniture manufacturers have used foam rubber extensively as a cushioning material. By far the major use of foam rubber by this industry is in molded foam rubber cushions which when covered with fabric or other upholstery material form seat or back cushions for chairs or sofas. These molded foam rubber cushions are made by cementing two similarly-shaped molded cushion halves together to form a cushion of the desired contour. The molded cushion halves are cored such as shown in U.S. Patents Nos. 2,310,830 and 2,604,663 by attaching core pins to the bottom mold section of the mold in which the cushion half is formed. The corings vary in cross-sectional diameter between ½ to 1¼ inches and extend inwardly from the bottom face of the cushion half to within about ½ inch of the top face of the cushion half providing an uncored surface layer (commonly referred to by the industry as "top stock") so that corings are not exposed when the bottom faces (the cored faces) of the two molded cushion halves are cemented together to form the foam rubber cushion. The use of coring facilitates the vulcanization of the congealed latex foam and also the freezing of the latex foam if the process described in U.S. Patent 2,432,353 is employed. The coring of foam rubber also is advantageous in that judicious coring of foam rubber does not reduce the load-carrying capacity of the foam rubber proportionate to the savings in latex realized as a result of the coring whereby a cored cushion of desired load-carrying capacity can be formed which is lighter in weight (with an attendant savings in latex) than is possible if the cushion were uncored.

The molded foam rubber cushions are made to the furniture manufacturer's specific design for a particular piece of furniture. Each furniture manufacturer requires a number of differently shaped cushions because of the great number of different styles and sizes of chairs and sofas which each furniture manufacturer offers for sale. Each differently shaped foam rubber cushion requires a separate mold for making the molded cushion halves for that style of cushion. The cost of these separate molds for each style and size of cushion materially contributes to the high cost of such cushions. In addition, the furniture manufacturer periodically restyles the furniture often changing the shapes of the cushions of the chairs and sofas. The changes in the cushion shapes necessitates that new molds be made for forming the restyled foam rubber cushions and that the molds for making the now obsolete cushion shapes either be scrapped prematurely or stored, a practice which further adds to the cost of the cushions.

It has not been feasible merely to cut a foam rubber cushion of the desired shape from an oversized piece of conventionally cored foam rubber (foam rubber having corings between ½ to 1¼ inches in diameter), since invariably the cut would traverse many of the corings and expose these corings at the sides of the foam rubber cushion so formed. The relatively large voids which would be exposed at the sides of the cushion would present an unsightly scalloped appearance and would be instrumental in causing the edges of the cushion to collapse when sat upon. Such a cushion obviously would be unacceptable. As a consequence, the manufacturers of cored foam rubber cushions have considered it necessary that such cushions be formed by individually molding cushion halves and cementing the halves together.

The present invention relates to foam rubber cored with small diameter core pins attached to both the top and bottom sections of the mold whereby coring extending into the foam rubber from both the top and bottom faces of the foam rubber is formed. Cushions of any desired size and shape can be cut from an oversized piece of foam rubber made in accordance with this invention. Such foam rubber cushions meet all of the specifications set by the furniture manufacturers. A cushion cut from foam rubber made in accordance with this invention does not have weak marginal edges of insufficient load-carrying capacity and does not present an unsightly edge even though the cut traverses a substantial number of corings.

Foam rubber formed in accordance with this invention has essentially the same compression resistance irrespective of along which axis the compression resistance is measured. This property is unique to foam rubber made in accordance with this invention, since uncored foam rubber slab and foam rubber cored with conventional size corings (½ to 1¼ inches in diameter) has not been found to exhibit this characteristic.

The invention will be clearly understood by referring to the following detailed description of specific embodiments of this invention and to the accompanying drawings in which:

FIG. 1 is a perspective view of a mold useful for forming foam rubber cushioning made in accordance with this invention;

FIG. 2 is a perspective view of foam rubber cushioning made in accordance with this invention;

FIG. 3 is a section on line 3—3 of FIG. 2;

FIG. 4 is a view similar to FIG. 3 except that it shows a different embodiment of the invention;

FIG. 5 is a view similar to FIG. 3 except that it shows still another embodiment of the invention; and FIG. 6 is a view similar to FIG. 3 except that it shows yet another embodiment of the invention.

Referring to the drawings, FIG. 1 shows a mold 10 in which foam rubber made in accordance with this invention may be formed. Mold 10 comprises a top mold section 11 and a bottom mold section 12 hinged together in a conventional manner. Attached to mold section 11 are generally cylindrical shaped core pins 13, 13 which extend downwardly into the mold cavity formed when the mold is closed. Similar core pins 14, 14 are attached to mold section 12 and extend upwardly into the mold cavity formed when the mold is closed. Core pins 13, 13, 14, 14 are attached to their respective mold section by any convenient manner, such as by welding or bolting the core pins to the mold section. The details of construction of the mold, such as the means for heating and cooling the mold (if cooling is desired), the means for introducing coagulating fluid into the mold cavity if the latex foam is coagulated in this manner, the means for sealing the mold, etc., are not described, since such details of construction of the mold are of conventional design and are well known.

The core pins 13, 13, 14, 14, in accordance with this invention, have a cross-sectional diameter at their point of greatest thickness between ⅛ and ¼ inch and are equally spaced with respect to each other in either an aligned or staggered pattern such that the percentage void area of the broadside faces of the foam rubber molding is at least 2 percent but not more than 20 percent. The "percentage void area" of a perforated surface is derived by dividing the area of the surface removed as a result of the perforation by the area of the surface prior to perforation and multiplying the quotient by 100. The "broadside faces" of foam rubber in the shape of slab (formed either in a closed mold or formed on a conveyor in a continuous operation) are the two opposite faces of the foam rubber slab having the largest surface areas, frequently referred to as the top and bottom faces of the foam rubber slab. The terms "percentage void area" and "broadside faces" are well known to those engaged in the manufacture of foam rubber and are commonly used when describing flat pieces of foam rubber.

FIG. 2 represents a relatively flat slab 15 of foam rubber such as would be formed in mold 10. As is shown in FIGS. 3 through 6, the foam rubber slab 15 is cored into from both broadside faces 16 and 17 to provide corings 18, 18 extending inwardly into the foam rubber slab 15 from the top broadside face 16 and corings 19, 19 extending inwardly into the foam rubber slab 15 from the bottom broadside face 17. Corings 18, 18 and corings 19, 19, in accordance with this invention, have a maximum cross-sectional diameter between ⅛ and ¼ inch and, although they are shown in the drawings to be generally cylindrical in shape, may vary in shape. For example, corings 18, 18, 19, 19 may be generally conical in shape. The corings 18, 18 and corings 19, 19 may either be aligned with respect to each other (as shown in FIG. 2) or staggered, and are equally spaced with respect to their adjacent corings such that the broadside faces 16 and 17 are uniformly perforated over their entire areas by corings. The number of corings extending inwardly from either broadside face is such that the percentage void area of each broadside face 16 and 17 is at least 2 percent but not more than 20 percent. As indicated above, the "percentage void area" of a broadside face of a slab of foam rubber is determined by dividing the area represented by the summation of the cross-sectional areas of the corings measured at the broadside face level by the total area of the broadside face if it were uncored and multiplying the quotient by 100.

As shown in FIGS. 3 through 6, corings 18, 18 and corings 19, 19 do not extend completely through the thickness of the foam rubber slab. In the embodiment of this invention shown in FIG. 3, corings 18, 18 and corings 19, 19 all are of the same length and cross-sectional diameter and extend less than halfway through the thickness of the foam rubber slab. In this embodiment, corings 18, 18 are not directly opposed to corings 19, 19 but, rather, are offset from corings 19, 19. FIG. 4 illustrates an embodiment of this invention wherein corings 18, 18 and corings 19, 19 all are of the same length and cross-sectional diameter and extend more than halfway through the thickness of the foam rubber slab. As in the embodiment shown in FIG. 3, corings 18, 18 are not directly opposed to corings 19, 19 but are offset from corings 19, 19. Since corings 18, 18 and corings 19, 19 extend more than halfway through the thickness of the foam rubber slab, corings 18, 18 and corings 19, 19 project between each other. In the embodiment shown in FIG. 5, corings 18, 18 and corings 19, 19 all are of the same cross-sectional diameter and are arranged so that corings 18, 18 directly oppose but are spaced from corings 19, 19. Alternate corings of corings 18, 18 are of the same length but are longer than the remaining corings of corings 18, 18, the shorter corings of corings 18, 18 all being of an equal length, and alternate corings of corings 19, 19 are of the same length but are longer than the remaining corings of corings 19, 19, the shorter corings of corings 19, 19 all being of an equal length. Corings 18, 18 and corings 19, 19 are arranged so that the longer corings of corings 18, 18 directly oppose the shorter corings of corings 19, 19 (which arrangement inherently provides that the shorter corings of corings 18, 18 directly oppose the longer corings of corings 19, 19). In FIG. 6, an embodiment of this invention is illustrated in which corings 18, 18 and corings 19, 19 all extend less than halfway through the thickness of the foam rubber slab and are of equal length, although corings 18, 18 have a cross-sectional diameter greater than the cross-sectional diameter of corings 19, 19. Corings 18, 18 directly oppose corings 19, 19 but, since corings 18, 18 and corings 19, 19 do not extend halfway through the thickness of the foam rubber slab, opposing corings do not meet but are spaced apart. Other embodiments of this invention will be apparent from the above description of this invention.

The foam rubber cushioning can be made by any process useful for making foam rubber. Any latex may be used for forming the foam rubber cushioning. Among the latices most commonly used commercially for making foam rubber are natural rubber latices (which are aqueous dispersions of essentially a rubbery polymer of isoprene) and synthetic latices such as aqueous dispersions of rubbery polymers of open-chain conjugated diolefins having from four to eight carbon atoms exemplified by butadiene-1,3; 1,4-dimethyl butadiene-1,3;2,3-dimethyl butadiene-1,3, and the like, or rubbery copolymers of these and similar conjugated diolefins with each other or with copolymerizable monomeric materials containing a single ethylenic linkage, such as styrene, methyl acrylate, ethyl acrylate, methyl methacrylate, ethyl methacrylate, acrylonitrile, isobutylene, or similar materials, or the rubbery polymers of chloroprene, and the like. The latex is compounded in the usual manner with such ingredients as vulcanizing agents, antioxidants, zinc oxide and fillers. Other compounding ingredients for imparting desired properties to the foam rubber also may be added to the latex composition.

The foam rubber cushioning may be made in any desired length and width. Preferably, however, the foam rubber cushioning is made in a slab of sufficient length and width that two or more cushions can be cut from the single piece of foam rubber cushioning so that the cost of manufacturing the cushions is reduced. For example, a 110″ x 22″ x 4″ flat slab of molded foam rubber cushioning may be formed in accordance with this invention. From this single piece of cushioning five cushions measuring 22″ x 22″ x 4″ can be cut. It will be appreciated that the cost of molding the longer piece of cushioning and cutting the five cushions from the single molding is materially less than the cost of individually molding the five cushions. Since it is not objectionable if corings are traversed when cutting a cushion from foam rubber cushioning made in accordance with this invention, a cushion of any shape may be cut from the cushioning. Although the foam rubber cushioning has been shown as a flat slab of foam rubber, it will be understood that either the top or bottom surface of the foam rubber slab, or both such surfaces, may be arcuate in contour, if desired. For example, the top surface and/or the bottom surface of the foam rubber slab may be slightly crowned.

A relatively thick piece of foam rubber cushioning made in accordance with this invention can be sliced along a plane parallel to the broadside faces of the cushioning to form thinner pieces of cushioning. For example, a 4 inch thick flat slab of foam rubber cushioning could be sliced into four 1 inch thick flat slabs for use as topper stock or into two 2 inch thick flat slabs for use in making cushions where a seat cushion shallower than 4 inches in thickness would be satisfactory.

Another advantage of foam rubber cushioning made in accordance with this invention is that relatively small pieces of such foam rubber cushioning left after cutting irregularly shaped cushions from a slab of such foam rubber can be cemented together satisfactorily along their side edges to fashion a cushion from the pieces instead of scrapping them. The fashioning of a cushion by cementing together pieces of foam rubber cushioning would not be feasible if the corings were of conventional size and spacing since there normally would not be sufficient surface area at the side edges of the pieces (because of the relatively large exposed corings) to insure a satisfactory bond between the pieces. This problem is not encountered when bonding together pieces of foam rubber cushioning made in accordance with this invention because of the small diameter corings used.

Fabrics used for covering foam rubber cushions made in accordance with this invention give satisfactory wear and do not tend to soil unevenly under normal usage. This would not be true of a foam rubber cushion cored into from either or both broadside faces of the cushion with corings of conventional diameter (corings having diameters between ½ to 1¼ inches). This phenomenon was demonstrated by making two foam rubber cushions of equal size, one being cut from a 4 inch thick piece of foam rubber made in accordance with this invention (having 3/16 inch diameter corings) and the other being cut from a 4 inch thick piece of foam rubber cored into from both broadside faces with corings ½ inch in diameter. Each of the foam rubber cushions were covered with corduroy upholstery material and were subjected to repeated compressions under a laboratory impact tester. After 15,000 compressions, the fabric covering over the foam rubber cushion cored with ½ inch diameter coring showed excessive and non-uniform wear whereas the fabric covering over the foam rubber cushion made in acordance with this invention showed very little wear, and what little wear was evident appeared to be uniform. After repeated compressions it was observed that the fabric overlying the ½ inch diameter corings of the one cushion soiled to a greater degree than the remainder of the fabric covering for that cushion whereas the covering for the other cushion being tested did not soil unevenly.

In addition to the use of the foam rubber cushioning of this invention in furniture seat and back cushions, other uses of the cushioning will be apparent. For instance, the cushioning can be used for cushioning the arms of chairs and sofas, in head rests, in throw cushions and pillows, etc.

It is clear that many modifications and variations of this invention may be made without departing from the spirit and scope of this invention as defined in the appended claims.

I claim:

1. Foam rubber cushioning having top and bottom broadside faces, said cushioning having uniformly spaced corings extending inwardly from the bottom broadside face of the cushioning part way through the thickness of the cushioning, the bottom broadside face being uniformly perforated by said corings, said cushioning having uniformly spaced corings extending inwardly from the top broadside face of the cushioning part way through the thickness of the cushioning, the top broadside face being uniformly perforated by said corings which extend inwardly from the top broadside face, said corings which extend inwardly from the bottom broadside face of the cushioning being separated from said corings which extend inwardly from the top broadside face of the cushioning, essentially all of the corings which extend inwardly from the bottom broadside face of the cushioning and essentially all of the corings which extend inwardly from the top broadside face of the cushioning having a maximum diameter between ⅛ and ¼ inch, the bottom broadside face of the cushioning and the top broadside face of the cushioning each having a percentage void area between 2 and 20 percent.

2. Foam rubber cushioning having top and bottom broadside faces, said cushioning having uniformly spaced corings extending inwardly from the bottom broadside face of the cushioning a distance less than one-half the thickness of the cushioning, the bottom broadside face being uniformly perforated by said corings, said cushioning having uniformly spaced corings extending inwardly from the top broadside face of the cushioning a distance less than one-half the thickness of the cushioning, the top broadside face being uniformly perforated by said corings which extend inwardly from the top broadside face, said corings which extend inwardly from the top broadside face of the cushioning being directly opposed to the corings which extend inwardly from the bottom broadside face of the cushioning, essentially all of the corings which extend inwardly from the bottom broadside face of the cushioning and essentially all of the corings which extend inwardly from the top broadside face of the cushioning having a maximum diameter between ⅛ and ¼ inch, the bottom broadside face of the cushioning and the top broadside face of the cushioning each having a percentage void area between 2 and 20 percent.

3. Foam rubber cushioning having top and bottom broadside faces, said cushioning having uniformly spaced corings extending inwardly from the bottom broadside face of the cushioning a distance less than one-half the thickness of the cushioning, the bottom broadside face being uniformly perforated by said corings, said cushioning having uniformly spaced corings extending inwardly from the top broadside face of the cushioning a distance less than one-half the thickness of the cushioning, the top broadside face being uniformly perforated by said corings which extend inwardly from the top broadside face, said corings which extend inwardly from the top broadside face of the cushioning being offset from the corings which extend inwardly from the bottom broadside face of the cushioning, essentially all of the corings which extend inwardly from the bottom broadside face of the cushioning and essentially all of the corings which extend inwardly from the top broadside face of the cushioning having a maximum diameter between ⅛ and ¼ inch, the bottom broadside face of the cushioning and the top broadside face of the cushioning each having a percentage void area between 2 and 20 percent.

4. Foam rubber cushioning having top and bottom broadside faces, said cushioning having uniformly spaced corings extending inwardly from the bottom broadside face of the cushioning, said corings being of different lengths with alternate corings being of equal length and extending less than one-half the distance through the thickness of the cushioning and the remaining said corings being of equal length and extending a distance greater than one-half the distance through the thickness of the cushioning, the bottom broadside face being uniformly perforated by said corings, said cushioning having uniformly spaced corings extending inwardly from the top broadside face of the cushioning, said corings which extend inwardly from the top broadside face of the cushioning being of different lengths with alternate corings being of equal length and extending less than one-half the distance through the thickness of the cushioning and the remaining said corings which extend inwardly from the top broadside face of the cushioning being of equal length and extending a distance greater than one-half the distance through the thickness of the cushioning, the top broadside face being uniformly perforated by said corings extending inwardly from the top broadside face, said corings which extend inwardly from the top broadside face being directly opposed to the corings which extend inwardly from the bottom broadside face with the longer corings of the corings which extend inwardly from the top broadside face directly opposing the shorter corings of the corings which extend inwardly from the bottom broadside face, the corings which extend inwardly from the top broadside face being spaced from the opposing corings which extend inwardly from the bottom broadside face, essentially all of the corings which extend inwardly from the bottom broadside face of the cushioning and essentially all of the corings which extend inwardly from the top broadside face of the cushioning having a maximum diameter between ⅛ and ¼ inch, the bottom broadside face of the cushioning and the top broadside face of the cushioning each having a percentage void area between 2 and 20 percent.

5. Foam rubber cushioning having top and bottom broadside faces, said cushioning having uniformly spaced corings extending inwardly from the bottom broadside face of the cushioning a distance greater than one-half the thickness of the cushioning, the bottom broadside face being uniformly perforated by said corings, said cushioning having uniformly spaced corings extending inwardly from the top broadside face of the cushioning a distance greater than one-half the thickness of the cushioning, the top broadside face being uniformly perforated by said corings which extend inwardly from the top broadside face, said corings which extend inwardly from the top broadside face of the cushioning being offset from the corings which extend inwardly from the bottom broadside face of the cushioning whereby the corings which extend inwardly from the bottom broadside face extend between the corings which extend inwardly from the top broadside face, essentially all of the corings which extend inwardly from the bottom broadside face of the cushioning and essentially all of the corings which extend inwardly from the top broadside face of the cushioning having a maximum diameter between ⅛ and ¼ inch, the bottom broadside face of the cushioning and the top broadside face of the cushioning each having a percentage void area between 2 and 20 percent.

6. Foam rubber cushioning having top and bottom broadside faces, said cushioning having uniformly spaced corings extending inwardly from the bottom broadside face of the cushioning part way through the thickness of the cushioning, the bottom broadside face being uniformly perforated by said corings, said cushioning having uniformly spaced corings extending inwardly from the top broadside face of the cushioning part way through the thickness of the cushioning, the top broadside face being uniformly perforated by said corings which extend inwardly from the top broadside face, said corings which extend inwardly from the bottom broadside face of the cushioning being separated from said corings which extend inwardly from the top broadside face of the cushioning, all of the corings which extend inwardly from the bottom broadside face of the cushioning and all of the corings which extend inwardly from the top broadside face of the cushioning having the same maximum diameter between ⅛ and ¼ inch, the bottom broadside face of the cushioning and the top broadside face of the cushioning each having a percentage void area between 2 and 20 percent.

References Cited in the file of this patent
UNITED STATES PATENTS

| | | |
|---|---|---|
| 2,192,601 | Mattison | Mar. 5, 1940 |
| 2,358,962 | Cunningham | Sept. 26, 1944 |
| 2,364,036 | MacKay et al. | Nov. 28, 1944 |
| 2,619,659 | Futterknecht | Dec. 2, 1952 |